United States Patent [19]
Levy et al.

[11] Patent Number: 6,088,524
[45] Date of Patent: Jul. 11, 2000

[54] METHOD AND APPARATUS FOR OPTIMIZING DATABASE QUERIES INVOLVING AGGREGATION PREDICATES

[75] Inventors: Alon Y. Levy; Inderpal S. Mumick, both of Berkeley Heights, N.J.

[73] Assignee: Lucent Technologies, Inc., Murray Hill, N.J.

[21] Appl. No.: 08/579,537

[22] Filed: Dec. 27, 1995

[51] Int. Cl.[7] .................................................. G06F 17/30
[52] U.S. Cl. ............................................ 395/603; 395/604
[58] Field of Search ..................................... 395/600, 601, 395/602, 603, 604; 364/419

[56] References Cited

U.S. PATENT DOCUMENTS

| | | | |
|---|---|---|---|
| 5,197,005 | 3/1993 | Shwartz et al. ......................... | 364/419 |
| 5,355,474 | 10/1994 | Thuraisngham et al. .............. | 395/600 |
| 5,367,675 | 11/1994 | Cheng et al. ........................... | 395/600 |
| 5,412,804 | 5/1995 | Krishna ................................... | 395/600 |
| 5,488,722 | 1/1996 | Potok ..................................... | 395/600 |
| 5,511,190 | 4/1996 | Sharma et al. ......................... | 395/603 |
| 5,535,385 | 7/1996 | Griffin et al. ........................... | 395/600 |
| 5,546,576 | 8/1996 | Cochrane et al. ..................... | 395/600 |
| 5,548,755 | 8/1996 | Leung et al. ........................... | 395/600 |
| 5,574,900 | 11/1996 | Huang et al. ........................... | 395/601 |
| 5,655,080 | 8/1997 | Dias et al. ......................... | 395/200.32 |
| 5,659,725 | 8/1997 | Levy et al. ............................. | 395/603 |

OTHER PUBLICATIONS

Levy et al, Query Optimization by Predicate Move–Around, 20th VLDB Conference, pp. 96–107, Sep. 1994.

Jim Melton and Alan R. Simon, Understanding the New SQL: A Complete Guide (1993).

Jeffrey D. Ullman, Principles of Database and Knowledge—Base Systems, vol. II: The New Technologies (1989).

Inderpal Singh Mumick, et al., "Magic is Relevant," in Proceedings of ACM SIGMOD, pp. 1–13 (1990).

Hamid Pirahesh, et al., "Extensible/Rule Based Query Rewrite Optimization in Starburst," in Proceedings of ACM SIGMOD, pp. 39–48 (Jun. 1992).

Alon Y. Levy, et al., "Query Optimization by Predicate Mover–Around," in Proceedings of the 20th VLDB Conference, Santiago Chile (1994).

Umeshwar Dayal, "Of Nests and Trees: A Unified Approach to Processing Queries That Contain Nested Subqueries, Aggregates, and Quantifiers," in Proceedings of the 13th VLDB Conference, pp. 197–208 (1987).

M. Muralikrishna, "Improved Unnesting Algorithms for Join Aggregate SQL Queries," in Proceedings of the 18th VLDB Conference, pp. 91–102 (1992).

Surajit Chaudhur and Kyuseok Shim, "Including Group–By in Query Optimization," in Proceedings of the 20th VLDB Conference. pp. 354–366 (1994).

Kenneth A. Ross, et al., "Foundations of Aggregation Constraints," in Principles and Practice of Constraint Programming, pp. 193–204 (Alan Borning, ed., 1994).

Won Kim, "On Optimizing an SQL–like Nested Query," in ACM Transaction on Database Systems, vol. 7, No. 3, pp. 443–469 (Sep. 1982).

Richard A. Ganski, et al., "Optimization of Nested SQL Queries Revisited," in Proceedings of Ociation for Computing Machinery Special Interest Group on Management of Data, vol. 16 No. 3, pp. 23–33 (Dec. 1987).

*Primary Examiner*—Thomas G. Black
*Assistant Examiner*—Frantz Coby

[57] ABSTRACT

A method and apparatus for optimizing a query involving aggregation. Aggregation predicates are represented by a constraint language through which relationships involving aggregation predicates can be shown. As a result, new predicates can be inferred from an initial set of aggregation predicates and optimization techniques which involve inferring new predicates can be applied. It is also shown how to restrict the inferences involving aggregation predicates to only those predicates which will lead to new predicates which are relevant to query optimization. In general, the technique is not limited to query optimization, but may be applied to various applications involving the manipulation of aggregation predicates.

24 Claims, 6 Drawing Sheets

FIG. 1

```
10 ─┐ CALLS (FromAC, FromTel, ToAC, ToTel, Date, Length)
11 ─┘ CUSTOMERS (AC, Tel, OwnerName, MemLevel)
```

FIG. 2

```
20 ─┐
CREATE VIEW ptCustomers (AC, Tel, ToAC, MaxLen, MinDate) AS
SELECT c.AC, c.Tel, t.ToAC, MAX (t.Length), MIN(t.Date)
FROM CUSTOMERS c, calls t
WHERE c.AC = t.FromAC AND
    c.Tel = t.FromTel AND
    c.MemLevel = 'Silver'
GROUPBY c.AC, c.Tel, t.ToAC.
```

FIG. 3

```
30 ─┐
CREATE VIEW wellCalled (ToAC, MaxLen) AS
SELECT t.ToAC, MAX(t.Length)
FROM calls t
GROUPBY t.ToAC.
```

FIG. 4

```
SELECT p.AC, p.Tel, p.ToAC, p.MaxLen, p.MinDate,
FROM wellCalled w, ptCustomers p
WHERE w.ToAC = p.ToAC AND
w.MaxLen < 100 AND
p.MaxLen > 10 AND
p.MinDAte < April 1, 1994.
```

FIG. 5

```
CREATE VIEW wellCalled (ToAC, MaxLen) AS
SELECT t.ToAC, MAX(t.Length)
FROM calls t
WHERE t.Length > 10
GROUPBY t.ToAC
```

CREATE VIEW ptCustomers (AC, Tel, ToAC, MaxLen, MinDate) AS

SELECT c.AC, c.Tel, t.ToAC, MAX (t.Length), MIN(t.Date)

FROM CUSTOMERS c, calls t

WHERE c.AC = t.FromAC AND c.Tel = t.FromTel AND c.MemLevel = 'Silver' AND (t.Length > 10 OR t.Date < April, 1 1994)

GROUPBY c.AC, c.Tel, t.ToAC.

CREATE VIEW V AS

SELECT $E_1.A$, $E_1.B$

FROM $E_1$, $E_2$

WHERE $E_1.A = E_2.C$

METHOD AND APPARATUS FOR OPTIMIZING DATABASE QUERIES INVOLVING AGGREGATION PREDICATES

FIELD OF THE INVENTION

The present invention relates generally to a method for converting aggregation constraints to ordinary constraints and in particular, for use in database query optimization.

BACKGROUND OF THE INVENTION

Data base systems are widely used to store and access large quantities of data. System users can access portions of the stored data through queries that take advantage of the manner in which the stored data is organized. Many modern data base systems are relational data base systems. In such systems, the data is organized into a set of relations, each consisting of a table whose columns, referred to as attributes, define classes of data and whose rows, referred to as tuples, contain related values of the data. For example, information on a company's employees could be stored in an employee relation with four attributes. One attribute would contain the name of each employee, a second, each employee's salary, a third, each employee's position, and the fourth, each employee's starting date of employment. Each tuple, or row, would contain all four classes of information for a single employee.

Two kinds of relations exist in a relational data base system: base relations in which the data values are actually stored in the data base system; and views, which are constructed from base relations as an intermediate step in solving a particular query. A query posed to a relational data base system, indicates those relations from which the information responsive to the query can be found. The query also provides predicates which delimitate the scope of relevant information. For instance, a query asking for the names of all employees earning more than $30,000 has the predicate salary is greater than $30,000. If the data processor would look to the above exemplary employee relation for the answer to this query, it would select the relevant information from those tuples alone, whose salary attribute has a value greater than 30,000. Thus, "salary is greater than $30,000" is a constraint on the solution to the query.

Some queries involve aggregation. Aggregation occurs where the desired information is not an attribute of a single tuple, but is rather the result of applying a function over multiple tuples. Examples of aggregation functions include MIN, MAX, SUM, AVG and COUNT. A more complete list of aggregation functions can be found in Jim Melton and Alan R. Simon, *Understanding the New SQL: A Complete Guide* (Morgan Kaufmann Publishers Inc. 1993), incorporated by reference as if fully set forth herein. Predicates which involve a limit on an aggregated attribute are known as aggregation predicates. One example of an aggregation predicate is found in a query to find the number of employees earning more than $30,000. The solution to this query involves applying the COUNT function on the employee name attribute.

Often, the solution to a query involves the intermediate step of solving one or more subqueries. For instance, a company with ten divisions may have a database with an employee relation for each division. Given the above query, find the employee with the highest salary from all employees in the company, the data processor system cannot search one relation alone for the solution. Instead, the data processor system can search for the highest paid employee in each relation and create a view relation consisting of the highest paid employee in each division. This view relation is the solution to the subquery: find the highest paid employee in each division. The original query: find the highest paid employee in the company, can now be solved from the solution to the subquery, by selecting the tuple with the greatest value stored in the salary attribute.

Queries for most relational database systems are written in a language called SQL. A query in SQL will have a SELECT clause indicating the attributes from which the data responsive to the query can be found; a FROM clause, indicating those relations from which the attributes named in the SELECT clause, can be found; and a WHERE clause indicating the predicates to be applied on one or more of the attributes named in the SELECT clause.

The following is an example of a query in SQL, found in FIG. 4, based on the two base relations of FIG. 1, calls (10) and customers (11) whose solution requires the intermediate step of solving the two views of FIGS. 2 and 3, potential customers ("ptCustomers") (20) and wellCaUed (30). The query is a marketing query to gather information for a targeted mailing to customers who have been making long calls into those area codes where the longest calls coming in from anybody are relatively short. The query restricts its search to those customers who have been calling into the particular area code for a long time. The solution to this query includes first defining two view relations from the two base relations.

The two relations of FIG. 1, contain information relating to all telephone calls made over a telephone network during the previous year. The relation calls (10), stores information relating to calls placed on the network, including the source area code and number ("FromAC" and "FromTel"), the destination area code and number ("ToAC" and "ToTel"), and the length, and date of the call. Each number, including area code, on the network is associated with a tuple, and six attributes indicate the six types of information stored for each number. The name of each customer, their area code ("AC"), telephone number ("Tel") and membership level in the network (regular, silver or gold) ("MemLevel") are stored in customers (11). Accordingly, this relation comprises a tuple for each customer each with four attributes, indicating the four types of stored information.

ptCustomers (20) considers only those customers whose membership level is 'silver', and computes the maximum length call placed by each of those customers to every area code and the earliest date on which that customer placed a call to that area code. wellCalled (30) computes the longest call placed to each area code among all the calls made over the network during the previous year. The query of FIG. 4 chooses the tuples from ptCustomers (20) which identify customers whose first call to a particular area code was prior to Apr. 1, 1994 and whose longest call to that area codes was more than ten minutes, for those area codes to which no one has made a call lasting more than one hundred minutes. The maximum length and earliest date are computed by applying Max and Min aggregation functions on the Date and Length attributes of calls (10), respectively.

Both the query and the view definitions use Select-From-Where clauses. The query states: SELECT the information stored in attributes, AC, Tel, MaxLen and MinDate, FROM wellCalled (30) and ptCustomers (20), only for those tuples WHERE the information stored in the attribute TOAC of wellCalled (30) is the same information as is stored in the attribute ToAC of ptCustomers (20), the value stored in attribute MaxLen of wellCalled (30) is less than one hundred, the value stored in attribute MaxLen of ptCustomers (20) is greater than ten, and the information stored in the attribute MinDate of ptCustomers (20) is earlier than Apr. 1, 1994.

Similarly, the Select-From-Where clauses of FIGS. 2 and 3 define the views ptCustomers (20) and wellCalled (30), respectively, based on base relations calls (10) and customers (11). In addition to the Select-From-Where clauses, the views are also defined by a Groupby clause. The Groupby clause helps to define the tuples of the view by combining all the tuples of the defining relations which have the same value for an identified attribute, into a single tuple in the view relation. For example, in FIG. 2, all the tuples in calls (10) with the same information stored in attribute ToAC, and all the tuples in base relation customers (11) having the same information stored in attributes AC and Tel, will be combined into a single tuple in ptCustomers (20).

Since many data bases are very large, an efficient method for responding to queries is essential. The phrase "query optimization" refers to the techniques used to organize the necessary computations, to reduce the time and memory resources required to respond to a query. The strategy of optimization is to reduce the number of predicates that must be computed in solving the query and to apply those predicates as early as possible. Thus the example query above, find the highest paid employee, can be optimized by applying the maximum salary predicate when constructing the view relation.

A number of techniques for applying predicates as early as possible are well known and are generally referred to as query rewrite algorithms. One class of these techniques are known as "predicate push-down techniques," which are described more fully in, Jeffrey D. Ullman, *Principles of Database and Knowledge-Base Systems*, (Computer Science Press 1989), incorporated by reference as if fully set forth herein.

In a related application, Query Optimization by Predicate Move-Around, U.S. Ser. No. 08/254,215, filed on Jun. 6, 1994, hereby incorporated by reference as if fully set forth herein, a general optimization technique is disclosed to move predicates around a query graph, to the particular node where their application is most efficient. A query graph is a pictorial representation of a query in which each of the query's subqueries and views form a block, or node. The query forms the root of the graph. Use of query graphs is well-known in the art. See, Inderpal S. Mumick, et al., *Magic is Relevant*, in Proceedings of ACM SIGMOD, at 247–58 (International Conference on Management of Data, May 23–25, 1990); Hamid Pirahesh, et al., *Extensible/Rule Based Query Rewrite Optimization*, in Starburst, in Proceedings of ACM SIGMOD at 39–48 (International Conference on Management of Data, Jun. 2–5, 1992); Inderpal S. Mumick and Hamid Pirahesh, *Implementation of Magic in Starburst*, in Proceedings of ACM SIGMOD (International Conference on Management of Data, May 25–27, 1994); and Alon Levy, et al., *Query Optimization by Predicate Movearound,* in Proceedings of the 20th International Conference on Very Large Databases at 96–107 (Jorge Bocca, et al., eds. Sep. 12–15, 1994), the disclosures of which are hereby incorporated by reference as if fully set forth herein.

In advanced database applications such as decision-support systems, the queries can become very complex due to their dependency on many subqueries and views. Optimizing these complex queries with prior art methods is difficult because the query blocks representing these queries cannot always be merged and traditional cost-based plan optimizers, which can only handle one query block at a time, cannot be applied. In particular, query optimizers are especially ineffective in dealing with queries involving aggregation.

Aggregation predicates are very important in large database applications, where complex decision-support queries must retrieve data by applying one or more different aggregation functions on a number of base relations, and then applying many predicates on the aggregation views. While aggregation renders query optimization with known techniques difficult and in many cases impossible, aggregation is necessary and optimization of aggregation queries, which entails manipulating aggregation predicates, is critical for large scale systems.

Manipulating aggregation predicates is important not only in query optimization, but in other applications as well, including, but not limited to, logic programming, constraint programming, constraint databases and global information systems. For example, in global information systems, techniques for pushing predicates down a query graph are used in order to determine which of the many available external databases is relevant to a given query. Where aggregation predicates are involved, a method for manipulating them is necessary.

The prior art methods for optimizing queries involving aggregation have limited optimization capability. For instance, in Kenneth Ross, et al., *Foundations of Aggregation Constraints,* in, Principles and Practice of Constraint Programming (Alan Borning, ed. 1994. LNCS 874), incorporated by reference as if fully set forth herein, the authors consider only two specific aggregation cases. The first case involves a single groupby operation in a view and they provide an intra-relation inference procedure to infer predicates containing arbitrary linear constraints. In the second case, the authors provide a view-to-relation inference procedure to deal with the case of a single aggregation function in a grouping operation. However, the constraint language and the reasoning framework provided do not allow the inference of the various types of predicates needed for query optimization.

There has also been work on optimizing queries with aggregation in correlated subqueries by way of decorrelation, converting the subqueries into views, with a magic-sets transformation to follow. See, Won Kim, *On Optimizing An SQL-Like Nested Query,* in, ACM Transactions on Database Systems, (September 1982); Richard A. Ganski and Harry K. T. Wong., *Optimization of Nested SQL Queries Revisited,* in, Proceedings of ACM SIGMOD at 23–33 (International Conference on Management of Data, May 1987); Umeshwar Dayal, *Of Nests and Trees: A Unified Approach to Processing Queries that Contain Nested Subqueries, Aggregates, and Quantifiers,* in, Proceedings of the Thirteenth International Conference on Very Large Databases VLDB at 197–208 (Sep. 1–4, 1987); M. Muralikrishna, *Improved Unnesting Algorithms for Join Aggregate SQL Queries,* in, Proceedings of the Eighteenth International Conference on Very Large Databases VLDB at 91–102 (Aug. 23–27, 1992); Mumick, *Magic is Relevant,* supra; and Mumick, *Implementation of Magic in Starburst,* supra, the disclosure of which are hereby incorporated by reference as if fully set forth herein.

Surajit Chaudhuri and Kyuseok Shim, *Including Groupby in Query Optimization,* in, Proceedings of the 20th International Conference on Very Large Databases at 354–66 (Bocca et al., eds., Sep. 12–15, 1994), incorporated by reference as if fully set forth herein, teaches that it is often possible to perform a grouping operation before a join or selection operation in the same query block. Although decorrelation and commuting groupings with joins, changes the structure of the query graph given a set of predicates, it does not provide the most optimal predicates for solving a given query.

SUMMARY OF THE INVENTION

Accordingly, it is an objective of the present invention to provide a means for indicating relationships between two predicates where one or both are aggregation predicates. In furtherance of this objective, a new constraint language is taught in which all aggregation predicates are represented by functional terms.

It is a further objective of the present invention to provide a method for manipulating aggregation predicates in database applications. In particular, the present invention provides a method for optimizing the solution to database queries involving aggregation. In furtherance of this objective, all aggregation predicates are represented in a form from which relationships can be shown and new predicates inferred. New predicates are inferred from an initial set of predicates including the aggregation predicates in representative form.

Alternatively, those aggregation predicates in representative form, which are not relevant to deriving new predicates useful in optimizing the solution to the query, are excluded from the set of initial predicates from which inferences are made. In furtherance of this alternative method, a method is provided for identifying aggregation predicates in representative form, which are relevant to deriving new predicates useful in optimizing the solution to the query. After drawing all inferences according to a desired optimization scheme, the full set of predicates, initial and new, can be reduced to eliminate redundant and axiomatic predicates and those predicates remaining in their representative form.

BRIEF DESCRIPTION OF THE DRAWINGS

FIG. 1 depicts the base relations calls and customers in SQL notation.

FIG. 2 illustrates in SQL notation, the view ptCustomers constructed from the base relations of FIG. 1.

FIG. 3 illustrates in SQL notation, the view wellCalled, constructed from the base relation calls.

FIG. 4 illustrates in SQL notation, a marketing query constructed from the two view relations of FIGS. 2 and 3.

FIG. 5 illustrates in SQL notation, the view of FIG. 3, after optimization.

FIG. 6 illustrates in SQL notation, the view of FIG. 2, after optimization.

FIG. 7 illustrates in SQL notation, an exemplary view V, defined by two relations $E_1$ and $E_2$ and not involving any aggregation.

DETAILED DESCRIPTION OF THE INVENTION

Figure 8:
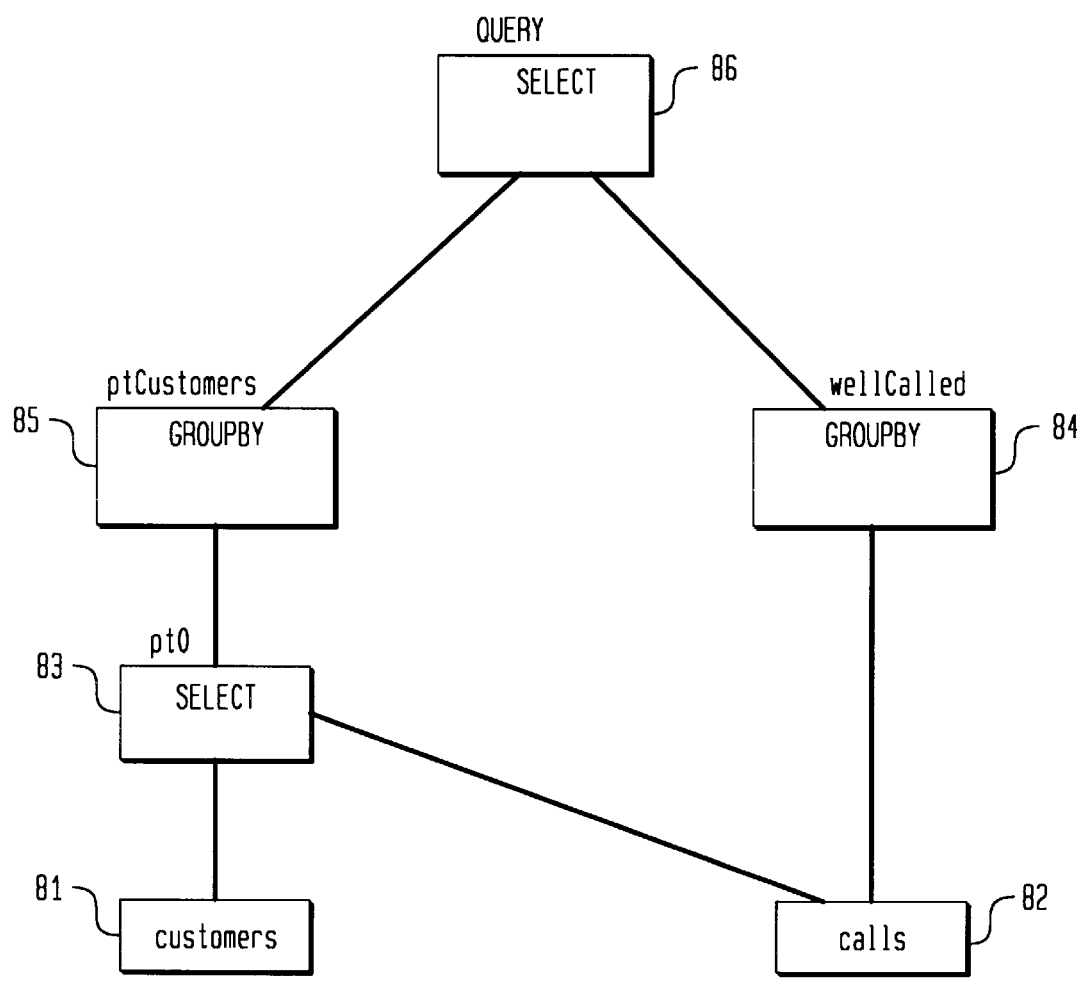
FIG. 8 depicts the query graph for the query of FIG. 4.

As a first step for manipulating aggregation predicates according to the present invention, it is necessary to define a constraint language in which to represent an aggregation predicate. The constraint language must represent the aggregation predicates in a form with which relationships between predicates can be shown. One advantageous constraint language according to the present invention, uses the functional term $f_{(R,\bar{X},A,Y)}$ to denote the class of predicates involving aggregation. In this form, R is a relation, base or view; $\bar{X}$ represents those attributes of relation R, which constitute a grouping list, and A is an aggregation function that is applied to the attribute Y of relation R. To illustrate, the maximum value of an attribute $A_2$ of relation R, grouped over $A_1$, will always be greater than or equal to the minimum value of $A_2$. This relationship between aggregation predicates can be shown as $f_{(R,A_1,Max,A_2)}(x) \geq f_{(R,A_1,Min,A_2)}(x)$.

Once relationships between aggregation predicates can be shown, a framework is available through which to infer new predicates from an initial set of predicates that include aggregation predicates. Although different optimization schemes will require different types of inferences and will dictate those of the inferred predicates which are relevant to optimize a query, the ability to infer new predicates from an initial set of predicates is a requirement they all share. Representing aggregation predicates by the functional terms as taught herein, enables inferences to be drawn from aggregation predicates and therefore makes optimization of queries, as well as other database applications, involving aggregation, possible.

As a simple illustration, consider, for example, a relation R(A, B, C), A, B and C being the attributes of R, and a predicate $c_1$, which states that for each tuple in relation R, the data in B, be less than or equal to the data in C, i.e., $(\forall t \in R)(t.B \leq t.C)$. Three new predicates, $c_2$, $c_3$ and $c_4$ can be inferred from $c_1$ and the following three relationships.

(1) If $(x \leq y)$ and $(y \leq z)$, then $x \leq z$;

(2) If $(\forall t \in p)(t.B \leq t.C)$, then $(\forall x)\, f_{(p,[\bar{x}],Min,B)}(x) \leq f_{(p,[\bar{x}],Min,C)}(x)$ which means that if for all tuples in a relation p, the values in B are less than or equal to the values in C, then for all tuples of a particular set of grouped attributes, the minimum value of B will be less than or equal to the minimum value of C; and (3) $(\forall x) f_{(p,[\bar{x}],Min,B)}(x) \leq f_{(p,[\bar{x}],Max,B)}(x)$, which means that for all tuples of a given set of grouped attributes, the minimum value of B will be less than the maximum value of B.

One can infer from relationship (2) a new predicate ($c_2$) $(\forall x) f_{(R,A,Min,B)}(x) \leq f_{(R,A,Min,C)}(x)$.

One can also infer from relationship (3) another new predicate, ($c_3$) $(\forall x) f_{(R,A,Min,C)}(x) \leq f_{(R,A,Max,C)}(x)$.

Lastly, one can infer from relationship (1) and predicates $c_2$ and $c_3$ a third new predicate, ($c_4$) $(\forall x) f_{(R,A,Min,B)}(x) \leq f_{(R,A,Max,C)}(x)$.

Three types of inferences are generally used to infer new predicates from an initial set of predicates. The first type, a relation-to-view inference, is used to infer relationships between terms involving a view and terms involving a relationship defining the view, so as to derive new predicates on a view from an initial predicate on the defining relation. The second type of inference is an intra-relation inference. This is used to derive new relationships between terms involving the same relation. The third type of inference is known as a view-to-relation inference. This is the reverse of the relation-to-view type, and is used to derive new predicates on a relation from a predicate on a view which is defined by the relation.

These three inference types fit naturally into query optimizers, such as the Starburst optimizer, described in Hamid Pirahesh, et al., Extensible/Rule Based Query Rewrite Optimization in Starburst, supra, or the predicate move-around algorithm. Relation-to-view inferences are made in the predicate pullup phase of predicate move-around, and view-to-relation inferences are made in the pushdown phase. The intra-relation inferences are made in both phases, while taking the deductive closure of the predicates in a node of the query graph.

With the constraint language presented above, it becomes possible to make relation-to-view, intra-relation and view-to-relation inferences with aggregation predicates to obtain a new set of predicates. In the following three subsections, exemplary relationships and inferences involving aggregation predicates in representative form, are shown for each of the three types of inference.

Relation-to-View Inference

In the relation-to-view inference, predicates between attributes and functional terms of a view are inferred from the predicates of the relations which define the view through a combination of selection, projection, cross product, union, grouping and aggregation operations. Referring to exemplary view V 70 of FIG. 7, the attributes of V 70 are taken from the attributes of relations $E_1$ and $E_2$. Since the tuples of the view are a subset of the tuples in $E_1$, the maximum values for V 70 cannot be greater than the maximum value from $E_1$. This relationship can be shown as $(\forall x) f_{(E_1, A, Max, B)} \geq f_{(V, A, Max, B)}(x)$.

Relation-to-view inferences result in various relationships, depending on how the view is defined. A view V can be defined by the projection of a subset of the attributes of another relation E. The set of attributes of V, $\overline{X_1}$, will be a subset of the set of attributes of E, $\overline{X_2}$. It follows that for any grouping of the attributes of V, which includes the attribute Y, the same group exists for E. Accordingly, applying the MAX or MIN function on Y in V is equal to the MAX or MIN of Y in E, respectively. This can be shown as (1) $(\forall \overline{x}) f_{(V, \overline{X}, A, Y)}(\overline{x}) = f_{(E, \overline{X}, A, Y)}(\overline{x})$, where A is either the MAX or MIN aggregation function.

If duplicates are preserved, in other words, where all like-value tuples in E are projected in the view as individual tuples, the same relationship is true for the functions SUM, AVG and COUNT. If duplicates are not preserved, then (2) $(\forall \overline{x}) f_{(V, \overline{X}, A, Y)}(\overline{x}) \leq f_{(E, \overline{X}, A, Y)}(\overline{x})$, for the SUM and COUNT aggregation functions.

A view V can also be defined by the selection of some or all of the tuples of all attributes of the defining relation E. V may have the same or fewer, but not more tuples than E. Accordingly, where the grouping list $\overline{X}$ is a subset of $\overline{X_1}$ and Y is an attribute of $\overline{X_1}$, the following relationships exist and can be shown using the constraint language described above:

(3) $(\forall \overline{x}) f_{(V, \overline{X}, MIN, Y)}(\overline{x}) \geq f_{(E, \overline{X}, MIN, Y)}(\overline{x})$;

(4) $(\forall \overline{x}) f_{(V, \overline{X}, MAX, Y)}(\overline{x}) \leq f_{(E, \overline{X}, MAX, Y)}(\overline{x})$;

(5) $(\forall \overline{X}) f_{(V, \overline{X}, COUNT, Y)}(\overline{x}) \leq f_{(E, \overline{X}, COUNT, Y)}(\overline{x})$; and (6) $(\forall \overline{x}) f_{(V, \overline{x}, SUM, Y)}(\overline{x}) \leq f_{(E, \overline{x}, SUM, Y)}(\overline{x})$.

Another set of relationships exists where V is the result of the cross product of relation $E_1$ with a set of attributes $\overline{X_1}$, and relation $E_2$ with a set of attributes $\overline{X_2}$, where $\overline{X_1}$ and $\overline{X_2}$ are different. In this case, V has both sets of attributes, $\overline{X_1}$ and $\overline{X_2}$. For each group of attributes which are a subset of $\overline{X_1}$, and where Y is an attribute of $\overline{X_1}$, the following relationships are true.

(7) $(\forall \overline{x}) f_{(V, \overline{X}, MIN, Y)}(\overline{x}) = f_{(E_1, \overline{X}, MIN, Y)}(\overline{x})$;

(8) $(\forall \overline{x}) f_{(V, \overline{X}, MAX, Y)}(\overline{x}) = f_{(E_1, \overline{X}, MAX, Y)}(\overline{x})$;

(9) $(\forall \overline{x}) f_{(V, \overline{X}, AVG, Y)}(\overline{x}) = f_{(E_1, \overline{X}, AVG, Y)}(\overline{x})$; and

(10) $(\forall \overline{x}) f_{(V, \overline{X}, COUNT, Y)}(\overline{x}) = f_{(E_1, \overline{X}, COUNT, Y)}(\overline{x}) \times \text{Size}(E_2)$, where Size ($E_2$) is the number of tuples in relation $E_2$.

V can also be defined by the union of two relations, $E_1$ and $E_2$, both having the same set of attributes $\overline{X_1}$. In this case, the following relationships are true and can be shown with the functional terms described herein:

(11) $(\forall \overline{x}) f_{(V, \overline{X}, MIN, Y)}(\overline{x}) \leq f_{(E_1, \overline{X}, MIN, Y)}(\overline{x})$;

(12) $(\forall \overline{x}) f_{(V, \overline{X}, MAX, Y)}(\overline{x}) \geq f_{(E_1, \overline{X}, MAX, Y)}(\overline{x})$;

(13) $(\forall \overline{x})(f_{(V, \overline{X}, MAX, Y)}(\overline{x}) = f_{(E_1, \overline{X}, MAX, Y)}(\overline{x})) \vee (f_{(V, \overline{X}, MAX, Y)}(\overline{x}) = f_{(E_2, \overline{X}, MAX, Y)}(\overline{x}))$;

(14) $(\forall \overline{x}) (f_{(V, \overline{X}, MIN, Y)}(\overline{x}) = f_{(E_1, \overline{X}, MIN, Y)}(\overline{x})) \vee (f_{(V, \overline{X}, MIN, Y)}(\overline{x}) = f_{(E_2, \overline{X}, MIN, Y)}(\overline{x}))$;

(15) $(\forall \overline{x}) f_{(V, \overline{X}, COUNT, Y)}(\overline{x}) \geq f_{(E_1, \overline{X}, COUNT, Y)}(\overline{x})$; and

(16) $(\forall \overline{x}) f_{(V, \overline{X}, SUM, Y)}(\overline{x}) \geq f_{(E_1, \overline{X}, SUM, Y)}(\overline{x})$.

The attributes of V can also be defined by grouping some of the attributes of E, and by applying an aggregation function on one or more other attributes of E. Where the grouping list is denoted by $\overline{X_1}$, and the set of aggregation functions and corresponding aggregated attributes are together denoted as $\overline{Z}$ the relationship that a particular function $A_i$ on a particular attribute $Y_i$ in E, over the list of attributes $\overline{X_1}$, equals $Z_i$ in V, where $Z_i = A_i(Y_i)$, can be shown as

(17) $(\forall v \in V,) v.z_i = f_{(E, \overline{X}_1, A_i, Y_i)}(E.\overline{X})$.

Furthermore, the MAX and MIN of an attribute in V is equal to the MAX and MIN of that same attribute in E, where V and E have the same grouping list, and can be shown as

(18) $(\forall v \in V,) f_{(V, \overline{X}, A, W)}(v.\overline{x}) = f_{(E, \overline{X}, A, W)}(v.\overline{x})$.

However, the COUNT of the attribute in V may be less than the COUNT of the same attribute in E, since V may have fewer tuples than E.

(19) $(\forall v \in V,) f_{(V, \overline{X}, A, W)}(v.\overline{x}) \leq f_{(E, \overline{X}, A, W)}(v.\overline{x})$.

Intra-Relation Inference

The second type of inference important to query optimization is known as an intra-relation inference. These inferences are used to infer predicates between functional terms of the same relation. Relationships between functional terms concerning the same relation, can involve functional terms in which the aggregate function is changed, the groupby list changes, or the aggregated attribute changes. Special relationships can also be inferred when the aggregated attribute is a member of the grouping list.

As an example of an intra-relation inference, consider that the maximum value of a given attribute is greater than or equal to the minimum value of that attribute. Similarly, the maximum value of a given attribute is greater than or equal to the average of all the values of that attribute. These relationships involve terms with different aggregation functions and can be represented as

(20) $(\forall \overline{x}) f_{(R, \overline{x}, MAX, Y)}(\overline{x}) \geq f_{(R, \overline{x}, MIN, Y)}(\overline{x})$; and

(21) $(\forall \overline{x}) f_{(R, \overline{x}, MAX, Y)}(\overline{x}) \geq f_{(R, \overline{x}, AVG, Y)}(\overline{x})$; respectively.

Similar intra-relation inferences, where only the aggregation function changes are found in Kenneth Ross, et al., *Foundations of Aggregation Constraints*, supra. Those relationships can also be expressed using the syntax disclosed herein.

Another intra-relations inference involves one functional term whose grouping list, $\overline{X_1}$ is a subset of the grouping list $\overline{X_2}$ of a second functional term. Examples, shown in the constraint language of the present invention, include:

(22) $(\forall \overline{x_2}) f_{(R, \overline{x}_2, MAX, Y)}(\overline{x_2}) \leq f_{(R, \overline{x}_1, MAX, Y)}(\overline{x_1})$;

(23) $(\forall \overline{x_2}) f_{(R, \overline{x}_2, MIN, Y)}(\overline{x_2}) \geq f_{(R, \overline{x}_1, MIN, Y)}(\overline{x_1})$;

(24) $(\forall \overline{X_2}) f_{(R,\overline{X_2},COUNT,Y)}(\overline{x_2}) \leq f_{(R,\overline{X_1},COUNT,Y)}(\overline{x_1})$; and

(25) $(\forall \overline{x_2}) f_{(R,\overline{X_2},SUM,Y)}(\overline{x_2}) \leq f_{(R,\overline{X_1},SUM,Y)}(\overline{x_1})$.

A third intra-relation inference involves two functional terms with different aggregated attributes. Since, for the same grouping, the number of tuples in each relation are the same, the COUNT, which equals the number of tuples, is the same for both attributes. This can be shown as

(26) $(\forall \overline{x}) f_{(R,\overline{X},COUNT,Y_1)}(\overline{x_2}) = f_{(R,\overline{X},COUNT,Y_2)}(\overline{x})$.

Moroeover, if every $Y_1$ is less than or equal to every $Y_2$ in R, then

(27) $(\forall \overline{x}) f_{(R,\overline{X},MIN,Y_1)}(\overline{x}) \leq f_{(R,\overline{X},MIN,Y_2)}(\overline{x})$;

(28) $(\forall \overline{x}) f_{(R,\overline{X},MAX,Y_1)}(\overline{x}) \leq f_{(R,\overline{X},MAX,Y_2)}(\overline{x})$;

(29) $(\forall \overline{x}) f_{(R,\overline{X},AVG,Y_1)}(\overline{x}) \leq f_{(R,\overline{X},AVG,Y_2)}(\overline{x})$; and

(30) $(\forall \overline{x}) f_{(R,\overline{X},COUNT,Y_1)}(\overline{x}) = f_{(R,\overline{X},COUNT,Y_2)}(\overline{x})$.

If $Y_1$ is less than a constant k, the above relationships can be simplified to

(31) $(\forall \overline{x}) f_{(R,\overline{X},MIN,\ Y_1)}(\overline{x}) \leq k$;

(32) $(\forall \overline{x}) f_{(R,\overline{X},MAX,\ Y_1)}(\overline{x}) \leq k$;

(33) $(\forall \overline{x}) f_{(R,\overline{X},AVG,\ Y_1)}(\overline{x}) \leq k$.

A fourth intra-relation inference involves an aggregated attribute which is one of the attributes in the grouping list. In this case, since there is only one tuple for each value in attribute $X_i$, the maximum, minimum or average of $X_i$ for each tuple is the value of $X_i$ in that tuple. This can be represented as

(34) $(\forall \overline{x}) f_{(R,\ \{X_1,\ \ldots\ X_m\},\ MAX,X_i)}(\overline{x}) = X_i$;

(35) $(\forall \overline{x}) f_{(R,\ \{X_1,\ \ldots\ X_m\},\ MIN,X_i)}(\overline{x}) = X_i$; and

(36) $(\forall \overline{x}) f_{(R,\ \{X_1,\ \ldots\ X_m\},\ AVG,X_i)}(\overline{x}) = X_i$.

View-to-Relation Inference

Lastly, the view-to-relation inference is used to infer predicates on a relation from one or more initial predicates involving a view defined by that relation. Where the view involves aggregation functions, the view-to-relation inference helps make computing simpler by eliminating those tuples in the defining relation which are irrelevant to the view. Consequently, the view can be computed by aggregating over fewer tuples.

The following illustration is used to explain how to determine which predicates on a relation can be inferred from a view V defined by that selection. Predicates can be inferred from an initial set of predicates which include aggregation functions as follows: the set of predicates which can be applied in the relation defining a view V, having a set of non-aggregated attributes $\overline{X}$ and a set of aggregated attributes $\overline{Z}$, includes all the predicates in V which do not involve Z, where the particular aggregate function $A_i$ for each $Z_i$ is a MAX or MIN direction and the aggregated attribute $Z_i$ is replaced by its corresponding $Y_i$ term.

To illustrate, suppose V has attributes $X_1$, $X_2$, $Z_1$, and $Z_2$, where $Z_i = A_i(Y_i)$ and the predicates $(X_1 \leq X_2)$, $(Z_1 \geq 5)$ and $(Z_2 \leq 2)$ where $A_1 = MAX$ and $A_2 = MIN$. The predicate $(X_1 \leq X_2)$ can be applied in the computation of V, in other words, prior to the grouping operation in V, because it applies to whole groups which have the same value in V and E resulting from the grouping operation. Furthermore, only tuples for which $Y_1 \geq 5$ are relevant to the computation of $Z_1$, and similarly, only tuples for which $Y_2 \leq 2$ are relevant to the computation of $Z_2$. However, since a tuple with $Y_2 \leq 2$ may actually be the one containing the maximum of $Y_1$, the conjunction of these two predicates cannot be applied in E. Rather, the disjunction of these predicates, $(X_1 \leq X_2)$ and $(Y_2 \leq 2$ or $Y_1 \geq 5)$, can be applied in E.

To move from the specific illustration to the abstract principle, all predicates in V which do not involve aggregation can be applied in E. In addition, all predicates involving $Z_i$ greater than or equal to a variable or a constant, where $A_i$ is MAX, or involving $Z_i$ less than, or less than or equal to a variable or constant, where $A_i$ is MIN, can be applied in E by replacing $Z_i$ with $Y_i$. Predicates involving the aggregation functions AVG, SUM or COUNT are not applied in E. If no predicates are associated with an aggregation in V, then only predicates which do not involve aggregation can be applied in E.

ILLUSTRATIVE EXAMPLE

An example of the present invention as applied to the query of FIG. 4 follows. The query, as discussed above, seeks information about customers who have been making long telephone calls into certain regions for some time. Three predicates constrain the scope of information relevant to the solution of this query. First, the longest call to a region of interest must be less than one hundred minutes. Second, a customer's longest call to that region must be greater than ten minutes. Third, the customer's earliest call to that region must have been prior to Apr. 1, 1994.

The optimal solution process of this query includes the views welCalled (50) and ptCustomers (60) of FIGS. 5 and 6, respectively. These views differ from those of FIGS. 3 and 4, described above, in two respects. First, prior to selecting the longest call to a particular area code from among all telephone calls, the realm of calls of interest are restricted to those calls longer than ten minutes. Since the query is only interested in calls longer than ten minutes, the process of selecting the longest call, which requires comparing tuples, is simpler if all calls shorter than ten minutes are first eliminated, leaving fewer tuples that need to be compared.

Second, the tuples of base relation calls (10) are restricted to either those calls longer than ten minutes, or those calls made prior to Apr. 1, 1994, before combining the two base relations and aggregating selected attributes in ptcustomers (60). Here too the effect is to remove the tuples which have no impact on the solution to the query, thereby simplifying subsequent operations.

The inferences leading to optimal views (50) and (60), involve relationships which can be represented by the constraint language described herein. Referring to the relationships introduced above, for the three types of inferences, the new predicates shown in FIGS. 5 and 6 can be derived as follows. From relationships (3), (4), (7) and (8), new relationships c1 and c2, between the potential customer view (60) and its defining relation calls (10), can be represented as (c1) $(\forall X,Y,Z) f_{(pto,\{AC,Tel,\ ToAC\},MAX,Length)}(X,Y,Z) \leq f_{(calls,\ \{FromAC,FromTel,ToAC\},MAX,Length)}(X,Y,Z)$; and (c2) $(\forall X,Y,Z) f_{(pto,\{AC,Tel,ToAC\},MIN,Date)}(X,Y,Z) \leq f_{(calls,\ \{FromAC,FromTel,ToAC\},MIN,Date)}(X,Y,Z)$.

From relationships (22) and (23), new relationships c3 and c4, between terms of the same relation calls (10) can be inferred.

(c3) $(\forall X,Y,Z) f_{(calls,\{ToAC\},MAX,Length)}(X,Y,Z) \leq f_{(calls,\ \{FromAC,FromTel,ToAC\})MAX,Length)}(X,Y,Z)$; and (c4) $(\forall X,Y,Z) f_{(calls,\{ToAC\},MIN,Length)}(X,Y,Z) \leq f_{(calls,\ \{FromAC,FromTel,ToAC\}),MIN,Date)}(X,Y,Z)$.

From relationship (17), new relationships c5, c6 and c7 can be inferred.

(c5) $(\forall p \in \text{ptCustomers})\ p.MaxLen = f_{(pto,\{AC,Tel,ToAC\},\ MAX,Length)}(p.AC,p.Tel,p.ToAC)$;

(c6) ($\forall$p $\epsilon$ ptCustomers) p.MaxLen=$f_{(pto,\{AC,Tel,ToAC\},MIN,Date)}$(p.AC,p.Tel,p.ToAC);

(c7) ($\forall$w $\epsilon$ wellCalled) w.MaxLen=$f_{(calls,\{ToAC\},MAX,Length)}$(w.ToAC).

From relationships c1 and c3, another relationship c8, can be inferred.

(c8) ($\forall$X,Y,Z)$f_{(calls,\{ToAC\},MAX,Length)}$(X,Y,Z)$\leq f_{(pto,\{AC,Tel,ToAC\}MAX,Lenth)}$(X,Y,Z).

From relationships c5, c7 and c8, it can readily be seen that (c9) w.MaxLen$\geq$p.MaxLen from which one can infer (c10) ($\forall$p $\epsilon$ ptCustomers, w$\epsilon$wellCalled) w.ToAC=p.ToAC.

Since it is known that w.ToAC=p.ToAC, the predicate (c9) w.MaxLen$\geq$p.MaxLen can be inferred in the query. From this term one can then derive a new predicate c11.

(c11) ($\forall$w $\epsilon$ wellCalled) w.MaxTen>10;

Predicates c12 and c13 are known (c12) ($\forall$p $\epsilon$ ptCustomers) p.MaxLen>10; and (c13) ($\forall$p $\epsilon$ ptCustomers) p.MinDate<April 1, 1994.

By applying view-to-relation inferences on relationships c11, c12 and c13, one can derive another two new predicates c14 on view wellCalled (50) and c15 on view pt0 (60).

(c14) ($\forall$t$\epsilon$calls) t.Length>10; and (c15) ($\forall$pO$\epsilon$ptO) (pO.Length>10 OR pO.Date<April 1, 1994).

These two new relationships then lead to the final predicate on relation calls (10)

(c16) ($\forall$t$\epsilon$calls) (t.Length>10 ORt.Date<April 1, 1994).

Figure 9:
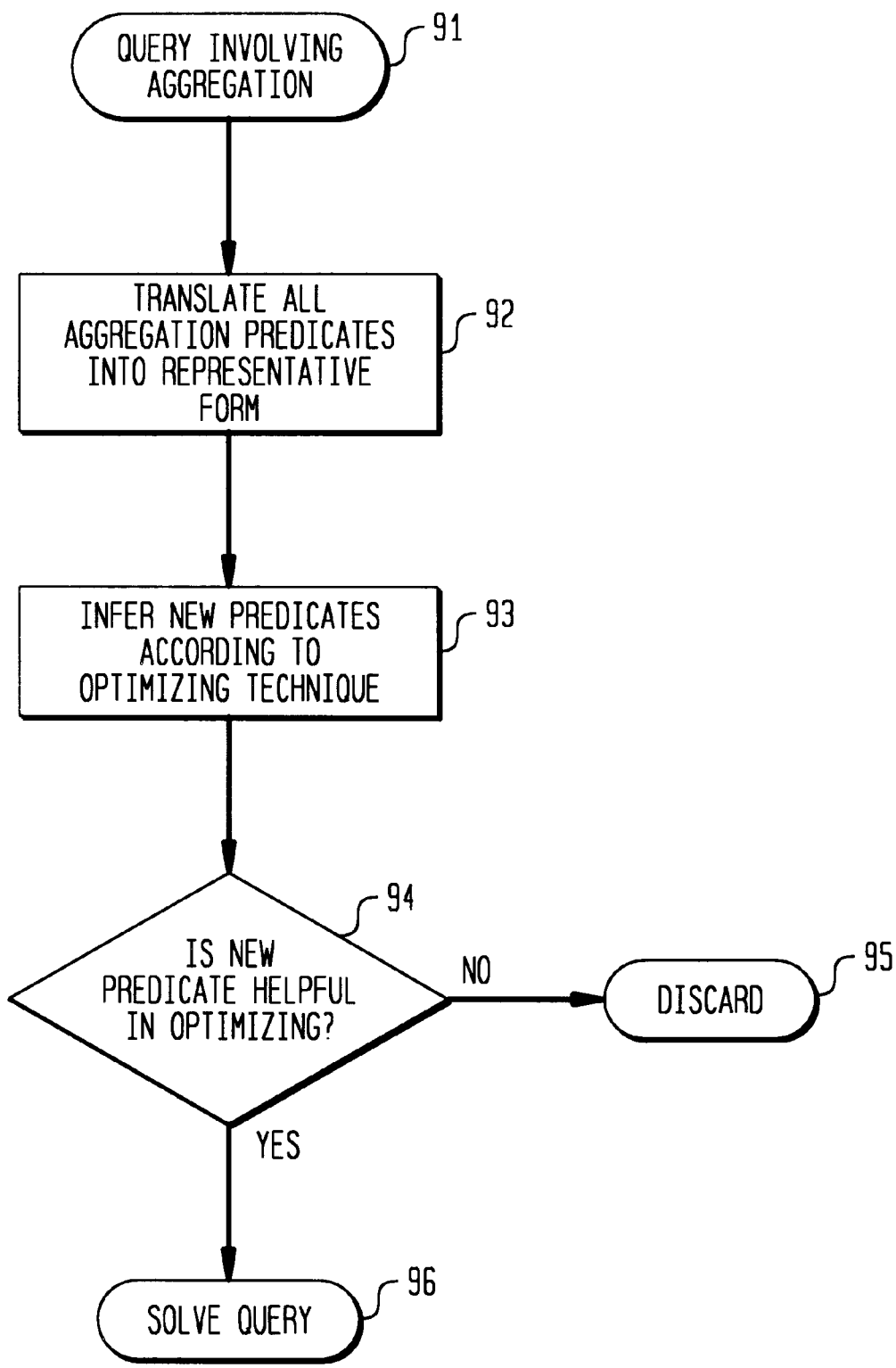
FIG. 9 is a flow chart of one embodiment of the present invention.

As explained previously, the exact place where the above inferences are made depends on the selected optimization technique. For the predicate move-around optimization technique predicates are inferred in three steps: initialization; predicate pullup; and predicate pushdown. Referring to FIG. 8, which shows a query graph of FIG. 4, and FIG. 9 which is a flow chart illustrating the basic steps of the present invention, the query of FIG. 4 can be optimized using the present invention and the move-around optimization technique, as follows.

Beginning with a query involving aggregation, as shown in block 91, all aggregation predicates are translated into their representative forms, as shown in block 92. In one advantageous embodiment, this involves using the functional term $f_{(R,X,A,Y)}$. In block 93, new predicates are inferred using an optimization technique of choice, as for example the move-around optimization technique.

During the initialization phase, SELECT nodes receive all predicates appearing in their respective WHERE clauses, and GROUPBY nodes receive all predicates appearing in their respective WHERE and HAVING clauses. A more detailed description can be found in Query Optimization By Predicate Move Around, U.S. Ser. No. 08/254,215, supra. Accordingly, for the query of FIG. 4, relationships c1–c4, c8, and c12–c13 are inferred and placed into their respective boxes.

During the predicate pullup phase, predicates are inferred from the bottom nodes of the query graph to the top nodes, i.e., from child node to parent node. For example, predicates in node 83 are used to infer predicates in node 85 and predicates in node 84 are used to infer predicates on node 86. Accordingly, relationships c5–c7 are inferred and pulled up into their respective parent boxes.

During the predicate pushdown phase, predicates are inferred from parent node to child node. For the query of FIG. 4, relationships c9–c11, and c14–c16 are inferred and pushed down into their respective child boxes.

At this point, block 93 is complete and block 94 indicates that the new predicates are examined to determine whether they are useful to solve the query. The predicates which are not useful are discarded in block 95. These include predicates appearing more than once, which only need to be applied at their earliest appearance, predicates involving functional terms, and predicates guaranteed to be true. Predicates involving functional terms need to be removed if the program which solves the query will not recognize the functional terms. Since it is expected that it will be too costly to implement predicates involving functional terms in solving the query itself, the optimizer program alone will be designed to recognize the functional terms to show relationships between predicates and infer new predicates. Thus, the predicates involving functional terms are removed in block 95, prior to solving the query in block 96.

As was seen, drawing inferences about relevant functional terms results in new predicates. Some of the new predicates will help to optimize the query while others will not. In general, axiomatic predicates, those that are guaranteed to be true, are not useful. In addition, those new predicates which involve aggregation functions may be too costly to implement so as to diminish the efficiencies achieved through optimization. For this reason, those new predicates, which will not help to optimize the query are discarded prior to solving the query.

Figure 10:
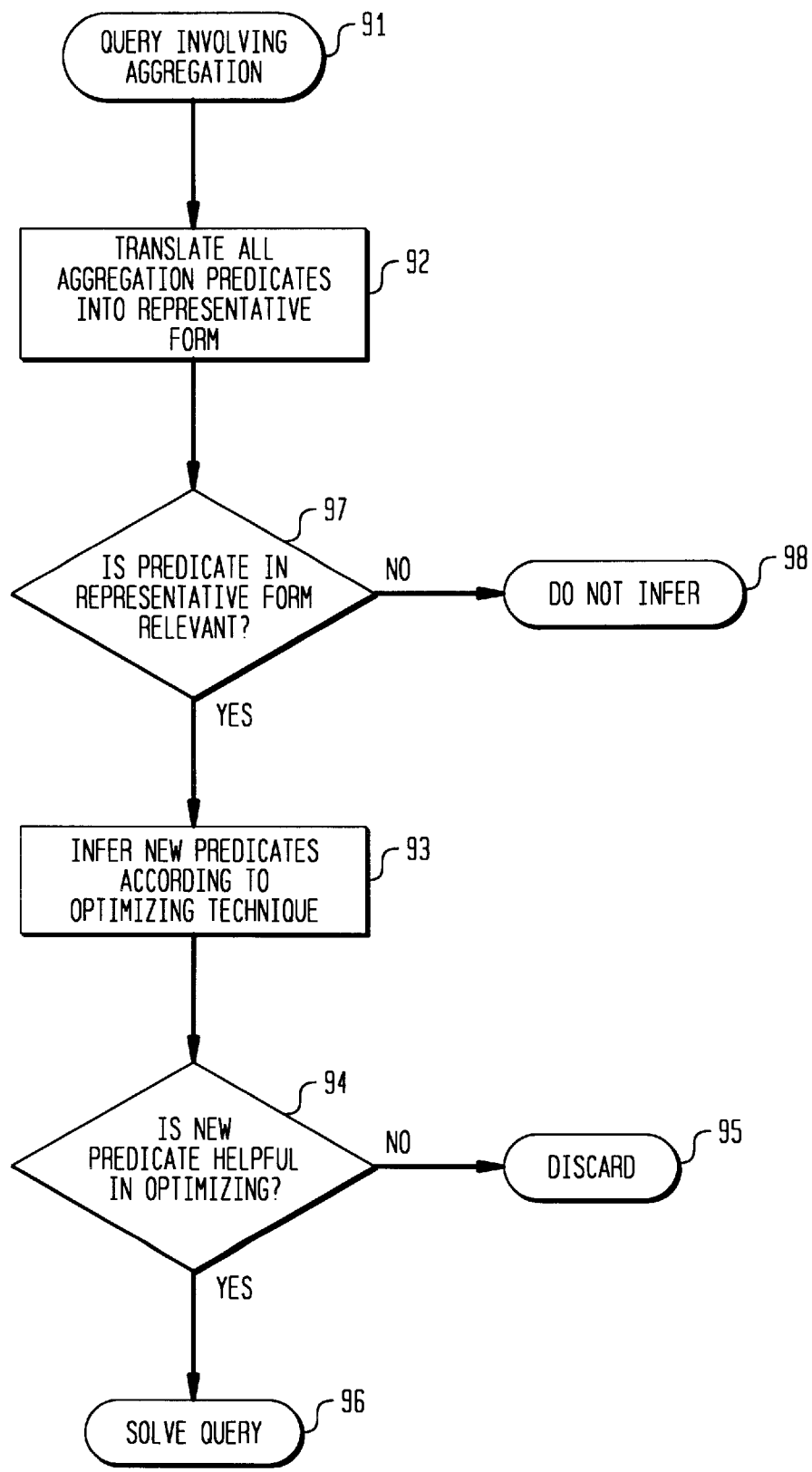
FIG. 10 is a flow chart of a second embodiment of the present invention.

Since it may occur that some of the new predicates will not be used to solve the query, it would be advantageous to identify those initial aggregation predicates which will not lead to new useful predicates. Accordingly, in another advantageous embodiment of the present invention, only functional terms relevant to deriving ordinary predicates are used to infer new predicates for query optimization. In this embodiment, the necessity to remove new predicates after they are inferred, is reduced by avoiding these new predicates altogether. Before new predicates are inferred, the initial predicates involving functional terms are examined to identify those predicates which only lead to predicates which will not help to optimize the query. These initial predicates are then discarded. This added decision step is shown as blocks 97 and 98 in FIG. 10.

To implement blocks 97 and 98, the predicates involving functional terms, which are relevant to optimizing a query, can be identified as those involving (i) a relation R upon which the query does an aggregation, or a relation R which defines a view upon which the query does an aggregation; and (ii) a groupby list and aggregated attribute Y in R or the projection of a groupby list and aggregation attribute of a different relation which defines R. The set of relevant groupby list and aggregated attribute pairs is represented by the symbol $GL_R$.

The relevant functional terms can also be identified with the use of a query graph. R is defined to include all base relations and relations which label a node in the query graph feeding into either a groupby node or leading into a relation that labels a node feeding a groupby mode.

$GL_R$ includes pairs, where the groupby list GL is used in a groupby node fed by R, and attribute Y is aggregated in the groupby node, as well as all pairs consisting of the projection of a groupby list and attribute from a relation that provides the attribute Y to R. By restricting inferences from functional terms to those terms involving R and $GL_R$, only relevant new predicates will be derived.

Referring to FIGS. 1, 4, 5–6 and 8, it is readily clear that R includes ptO (23), calls (82) and customers (81); $GL_{ptO}$ includes the two pairs ({AC, Tel, ToAC,} Length) and ({AC, Tel, ToAC}, Date); $GL_{calls}$ includes the three pairs ({FromAC, FroTel, ToAC}, Length), ({FromAC, FromTel, ToAC}, Date) and ({ToAC}, Length); and $GL_{customers}$ is an empty set. Thus, the only relevant functional terms, the terms only involving the above identified-relations, groupby lists and attributes, are:

$f_{(ptO,\{AC,Tel,ToAC\},A,Length)}$;

$f_{(ptO,\{AC,Tel,ToAC\},A,Date)}$;

$f_{(calls,\{FroAC,FromTel,ToAC\},A,Length)}$;

$f_{(calls,\{FroAC,FromTel,ToAC\},A,Date)}$; and $f_{(calls,\{ToAC\},A,Length)}$.

Indeed, the optimization of the query of FIG. 4, as illustrated above, involves only these functional terms.

The method of the present invention can be implemented with a general purpose microprocessor. The functional term $f_{(R,\bar{X},A,Y)}$ can be stored in readable memory and the steps for translating each aggregation predicate into its representative form can be software implemented. Alternatively, a dedicated microprocessor can be used to implement the method of the present invention with the general functional term and translating steps stored in read-only memory. In either implementation, readable memory is also provided for storing aggregation predicates in their representative form, until they are needed to implement a query optimization technique. The functional terms and the inference rules illustrated above can be made a part of the constraint language and inference mechanism that an optimizer uses for predicate analysis.

The foregoing merely illustrates the principles of the present invention. Those skilled in the art will be able to devise various modifications, which although not explicitly described or shown herein, embody the principles of the invention and are thus within its spirit and scope.

What is claimed is:

1. A computer implemented method for performing a database query involving aggregation, given an initial set of predicates which includes one or more aggregation predicates, said method comprising the steps of:

translating at least one of said aggregation predicates into a representative form which is a functional term symbolized by $f_{\{R,\bar{X},A,Y\}}$, wherein R is a relation having one or more attributes, $\bar{X}$ represents said attributes of R which are grouped and A is an aggregation function applied on attribute Y of R, said representative form suitable for illustrating a relationship involving said aggregation predicates;

inferring one or more new predicates, using said representative form from said initial set of predicates; and solving said database query using said new predicates.

2. A computer implemented method according to claim 1 wherein said inferring step comprises inferring predicates in a relation from other predicates of said relation.

3. A computer implemented method according to claim 1 wherein said inferring step comprises inferring predicates in a first relation from predicates in one or more second relations defining said first relation.

4. A computer implemented method according to claim 1 wherein said inferring step comprises inferring predicates in a first relation from predicates in a second relation defined by said first relation.

5. A computer implemented method according to claim 1 wherein said inferring step further comprises the steps of:

identifying said aggregation predicates in said $f_{\{R,\bar{X},A,Y\}}$ form which are relevant to said query; and inferring one or more new predicates from said relevant aggregation predicates in said $f_{\{R,\bar{X},A,Y\}}$ form.

6. A computer implemented method according to claim 5 wherein said relevant aggregation predicates in $f_{\{R,\bar{X},A,Y\}}$ form, are those which involve R and a groupby list and aggregation attribute pair, $GL_R$, where R includes any relation upon which said query does an aggregation, and any relation which defines a view upon which said query does an aggregation, and $GL_R$ includes any groupby list and aggregated attribute pair in R and any projection of a groupby list and aggregated attribute of a relation which defines R.

7. A computer implemented method according to claim 1 wherein said inferring step comprises the steps of:

determining whether one or more of said new predicates is not useful to solve said query; and eliminating said non-useful new predicate.

8. A computer implemented method according to claim 7 wherein said eliminating step involves eliminating axiomatic predicates.

9. A computer implemented method according to claim 7 wherein said eliminating step involves eliminating redundant predicates.

10. A computer implemented method according to claim 7 wherein said eliminating steps involves eliminating all predicates involving $f_{\{R,\bar{X},A,Y\}}$.

11. A computer implemented method according to claim 1 wherein said inferring step involves implementing a predicate pushdown optimization technique.

12. A computer implemented method according to claim 1 wherein said inferring step involves implementing a predicate move-around optimization technique.

13. A computer system for performing database queries involving aggregation given an initial set of predicates which includes one or more aggregation predicates, comprising:

means for translating at least one of said aggregation predicates into a representative form which is a functional term symbolized by $f_{\{R,\bar{X},A,Y\}}$, wherein R is a relation having one or more attributes, $\bar{X}$ represents said attributes of R which are grouped and A is an aggregation function applied on attribute Y of R, said representative form suitable for illustrating a relationship involving said aggregation predicates;

means for inferring one or more new predicates, using said representative form from said initial set of predicates; and means for solving said database query using said new predicates.

14. A computer system according to claim 13 wherein said means for inferring one or more new predicates comprises means for inferring predicates in a relation from other predicates of said relation.

15. A computer system according to claim 13 wherein said means for inferring one or more new predicates comprises means for inferring predicates in a first relation from predicates in one or more second relations defining said first relation.

16. A computer system according to claim 13 wherein said means for inferring one or more new predicates comprises means for inferring predicates in a first relation from predicates in a second relation defined by said first relation.

17. A computer system according to claim 13 wherein said means for inferring one or more new predicates further comprises:

means for identifying said aggregation predicates in said $f_{\{R,\bar{X},A,Y\}}$ form which are relevant to said query; and means for inferring one or more new predicates from said relevant aggregation predicates in said $f_{\{R,\bar{X},A,Y\}}$ form.

18. A computer system according to claim 17 wherein said relevant aggregation predicates in $f_{\{R,\bar{X},A,Y\}}$ form, are those which involve R and a groupby list and aggregation attribute pair, $GL_R$, where R includes any relation upon which said query does an aggregation, and any relation which defines a view upon which said query does an aggregation, and $GL_R$ includes any groupby list and aggregated attribute pair in R and any projection of a groupby list and aggregated attribute of a relation which defines R.

19. A computer system according to claim 13 wherein said means for inferring one or more new predicates comprises:
means for determining whether one or more of said new predicates is not useful to solve said query; and
means for eliminating said non-useful new predicate.

20. A computer system according to claim 19 wherein said eliminating means involves means for eliminating axiomatic predicates.

21. A computer system according to claim 19 wherein said eliminating means involves means for eliminating redundant predicates.

22. A computer system according to claim 19 wherein said eliminating meanss involves means for eliminating all predicates involving $f_{\{R,\bar{X},A,Y\}}$.

23. A computer system according to claim 13 wherein said means for inferring one or more new predicates involves means for implementing a predicate pushdown optimization technique.

24. A computer system according to claim 13 wherein said means for inferring one or more new predicates involves means for implementing a predicate move-around optimization technique.

* * * * *